US011258822B2

(12) United States Patent
Han

(10) Patent No.: US 11,258,822 B2
(45) Date of Patent: Feb. 22, 2022

(54) NETWORK FUNCTION SERVICE DISCOVERY METHOD AND DEVICE

(71) Applicant: HUAWEI TECHNOLOGIES CO., LTD., Guangdong (CN)

(72) Inventor: Tingjun Han, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 177 days.

(21) Appl. No.: 16/781,251

(22) Filed: Feb. 4, 2020

(65) Prior Publication Data
US 2020/0177632 A1 Jun. 4, 2020

Related U.S. Application Data

(63) Continuation of application No. PCT/CN2018/095974, filed on Jul. 17, 2018.

(30) Foreign Application Priority Data

Aug. 8, 2017 (CN) .......................... 201710671849.5

(51) Int. Cl.
*H04L 29/06* (2006.01)
*H04L 67/51* (2022.01)
(52) U.S. Cl.
CPC ........ *H04L 63/166* (2013.01); *H04L 63/0236* (2013.01); *H04L 63/0823* (2013.01); *H04L 63/102* (2013.01); *H04L 67/16* (2013.01)
(58) Field of Classification Search
CPC ....... H04W 60/00; H04W 60/04; H04W 8/08; H04W 12/08; H04W 28/24;
(Continued)

(56) References Cited

U.S. PATENT DOCUMENTS

| 9,794,352 B2 | 10/2017 | Qiang |
| 2005/0283619 A1 | 12/2005 | Min |

(Continued)

FOREIGN PATENT DOCUMENTS

| CN | 104734955 A | 6/2015 |
| CN | 106664221 A | 5/2017 |

(Continued)

OTHER PUBLICATIONS

H. Zhang et al.,"Service Chain Header draft-zhang-sfc-sch-03", Network Working Group, dated Dec. 23, 2014, total 17 pages.

(Continued)

*Primary Examiner* — Dustin Nguyen

(57) ABSTRACT

Embodiments of this application provide a network function service discovery method and a device. The method performed by an NRF includes: after establishing a communication connection to the NF, obtaining a digital certificate of the NF in a TLS or DTLS two-way authentication process, where the digital certificate of the NF carries a service name of the NF, a service name list on which the NF relies, and a service name list that relies on the NF; receiving a query request for querying an address of a target service that is sent by the NF, where the query request carries a complete domain name of the target service; and performing verification based on the service name of the target service and the digital certificate of the NF, and sending the address of the target service to the NF when the verification succeeds. Therefore, the NF services are discovered.

20 Claims, 11 Drawing Sheets

(58) Field of Classification Search
CPC .... H04W 12/068; H04L 63/102; H04L 67/16; H04L 67/143; H04L 67/1097
See application file for complete search history.

(56) References Cited

U.S. PATENT DOCUMENTS

| | | |
|---|---|---|
| 2016/0277509 A1 | 9/2016 | Qiang |
| 2016/0301579 A1 | 10/2016 | Djukic et al. |
| 2016/0301668 A1 | 10/2016 | Marquardt et al. |
| 2017/0012865 A1 | 1/2017 | Nainar et al. |
| 2017/0303259 A1* | 10/2017 | Lee ................ H04W 12/08 |
| 2017/0373939 A1 | 12/2017 | Liu |
| 2018/0198867 A1* | 7/2018 | Dao ................ H04L 67/143 |
| 2018/0227871 A1* | 8/2018 | Singh ............... H04W 12/068 |
| 2019/0037409 A1* | 1/2019 | Wang ............... H04W 8/08 |
| 2019/0230556 A1* | 7/2019 | Lee ................ H04W 60/00 |
| 2019/0313468 A1* | 10/2019 | Talebi Fard ......... H04W 60/04 |
| 2020/0028921 A1* | 1/2020 | Cai ................ H04L 63/102 |
| 2020/0177677 A1* | 6/2020 | Yang ............... H04L 67/1097 |
| 2020/0196133 A1* | 6/2020 | Kawasaki ............ H04W 28/24 |
| 2020/0228613 A1* | 7/2020 | Han ................ H04L 67/16 |
| 2021/0044481 A1* | 2/2021 | Xu ................ H04L 41/082 |
| 2021/0195506 A1* | 6/2021 | Bartolome Rodrigo .................... H04L 67/16 |

FOREIGN PATENT DOCUMENTS

| | | |
|---|---|---|
| CN | 106817236 A | 6/2017 |
| CN | 107005580 A | 8/2017 |
| WO | 2016/127436 A1 | 8/2016 |

OTHER PUBLICATIONS

3GPP TR 32.842 V1.1.0 (May 2015), 3rd Generation Partnership Project; Technical Specification Group Services and System Aspects; Telecommunication management; Study on network management of virtualized networks (Release 13), total 57 pages.

RFC7858 Z. Hu et al., "Specification for DNS over Transport Layer Security (TLS)", Internet Engineering Task Force (IETF), dated May 2016, total 19 pages.

International Search Report for PCT/CN2018/095974 dated Oct. 11, 2018 (7 pages).

C4-173259 Nokia et al.,"Pseudo-CR on Requirements for NF service discovery and selection", 3GPP TSG CT4 Meeting #78, Zhangjiajie, P.R. China; May 15-19, 2017, total 4 pages.

3GPP TS 23.501 V0.4.0 (Apr. 2017), 3rd Generation Partnership Project;Technical Specification Group Services and System Aspects;System Architecture for the 5G System; Stage 2(Release 15), Apr. 20, 2017, total 123 pages.

C4-174083 Ericsson,"Pseudo-CR on Service Discovery and Registration using NRF service", 3GPP TSG CT4 Meeting #79,Krakow, Poland; Aug. 21-25, 2017, total 5 pages.

Notice of Allowance issued in CN201710671849.5, dated Oct. 13, 2021, 4 pages.

* cited by examiner

NETWORK FUNCTION SERVICE DISCOVERY METHOD AND DEVICE

CROSS-REFERENCE TO RELATED APPLICATIONS

This application is a continuation of International Patent Application No. PCT/CN2018/095974, filed on Jul. 17, 2018, which claims priority to Chinese Patent Application No. 201710671849.5, filed on Aug. 8, 2017. The disclosures of the aforementioned applications are hereby incorporated by reference in their entireties.

TECHNICAL FIELD

This application relates to the field of communications technologies, and in particular, to a network function service discovery method and a device.

BACKGROUND

With the development of a 5th-generation (5G) mobile communications technology, in an evolution process of a core network architecture of a 5G network, a service-based network architecture centered on a network function (NF) and based on a cloud and virtualization technology is proposed. In the architecture, a network function repository function (NRF) is a network function that provides service registration and discovery functions for the NF. The NF may register one or more service addresses on the NRF. The registered service addresses are in a plurality of forms, and may be an IP address or a URL address. A service name is defined as <service name>.<NF name>.<PLMN>, for example, session-manager.SMF.<PLMN>. All NFs are located in a fully interconnected network topology, so as to implement physical deployment location decoupling between specific services. Therefore, the service-based network architecture helps quickly deploy new NFs to implement network service innovation.

A 5G network slice technology supports a plurality of services meeting different service level agreement (SLA) levels in a physical network, for example, internet of vehicles and virtual reality. FIG. 1 is a schematic diagram of distribution of network slices of a public land mobile network (PLMN) and NFs of the different network slices. As shown in FIG. 1, user equipment accesses the PLMN by using a radio access network node. The PLMN is divided into three network slices, and each network slice includes a group of NFs with a specific function. One NF includes at least one service. Multiple NF 1 (for example, an NF 1 in a network slice A and an NF 1 in a network slice B) located in different network slices are of a same type, and multiple NF 2 located in different network slices are of a same type. To meet a requirement that SLAs of services of NFs have different resource requirements and performance indicators, the NFs located in different network slices are isolated from each other even if the NFs are of the same type. Due to an implementation constraint, an NF (for example, an NF 3 in FIG. 1) shared between a plurality of network slices is also required. In addition, the network slices are dynamically deployed based on a subscription requirement of a client. To be specific, a life cycle of an NF in a network slice is unknown. Therefore, NFs in different network slices are also isolated in terms of services. As shown in FIG. 1, the NF 1 in the network slice A can perform service interaction only with the NF 2 in the network slice A, and cannot access an NF 2 of the same type outside the network slice A.

Therefore, in the foregoing service-based network architecture, the NFs located in different network slices need to be isolated from each other, and the NFs located in different network slices need to be isolated from each other in terms of services. Therefore, the NFs that are dynamically deployed need to be discovered, that is, NF services need to be discovered, and service consumers need to query addresses of service providers. How to discover the NF services is an urgent problem to be resolved.

SUMMARY

Embodiments of this application provide a network function service discovery method and a device, so as to discover NF services.

According to a first aspect, this application provides an NF service discovery method, including: after establishing a communication connection to an NF, obtaining, by a network function repository function (NRF), a digital certificate of the NF via a transport layer security TLS protocol or datagram transport layer security DTLS protocol two-way authentication process, where the digital certificate of the NF carries a service name of the NF, a service name list on which the NF relies, and a service name list that relies on the NF; receiving, by the NRF, a query request that is for querying an address of a target service and that is sent by the NF, where the query request carries a complete domain name of the target service, the complete domain name of the target service is a domain name formed by a service name of the target service and a management domain name of the NF, or the complete domain name of the target service is a domain name formed by a service name of the target service and a management domain name of the NF in which the target service target service is located, and the management domain name of the NF includes a network slice identifier of a network slice and an identifier of a network to which the network slice belongs; and performing, by the NRF, verification based on the service name of the target service and the digital certificate of the NF, and sending the address of the target service to the NF when the verification succeeds.

According to the first aspect, the NF service discovery method is provided to discover the NF services. In addition, in a process of discovering the NF services, the service name of the target service may be known by the NF. If service discovery is performed within a network slice, the NF queries the complete domain name of the target service formed by the service name of the target service and the management domain name of the NF when sending a query request. If the service discovery is performed between different network slices, the NF queries the complete domain name of the target service formed by the service name of the target service and the management domain name of the NF in which the target service queried by the NF is located when sending the query request. The management domain name of the NF includes the network slice identifier and the identifier of the network to which the network slice belongs, and the network slice identifier is managed by a management network element. Therefore, the NF can decouple from the network slice. In addition, a relying relationship between different services is placed in the extension field of the digital certificate of a service. The extension field of the digital certificate may only relate to the service name of the NF, and may not relate to the management domain name of the NF, thereby ensuring that the digital certificate of all services does not need to be updated due to a dynamically deployed slice, so as to decouple the NF from a service security mechanism. The network slice and the service security mechanism may be compatible with an existing TLS/DNS standard mechanism, and an existing NF can access the system without modification. Regardless of how the NF is dynamically deployed, the existing NF is not affected.

In an example implementation, the performing, by the NRF, verification based on the service name of the target service and the digital certificate of the NF includes: verifying, by the NRF, whether the service name of the target service is in the service name list on which the NF relies and that is carried in an extension field of the digital certificate of the NF, and whether the service name of the NF is included in the service name list that relies on the NF, that is carried in the extension field of the digital certificate, and that corresponds to the complete domain name of the target service that has been registered and stored.

In an example implementation, before the receiving, by the NRF, a query request that is for querying an address of a target service and that is sent by the NF, the method further includes: receiving, by the NRF, a first service registration request sent by the NF, where the first service registration request includes a complete domain name of a first service and a first service address, and the complete domain name of the first service is a domain name formed by the service name of the NF and the management domain name of the NF.

The methods provided in this implementation implement the registration of the NF service.

In an example implementation, the performing, by the NRF, service registration based on the complete domain name of the first service and the service name of the NF that is carried in the extension field of the digital certificate of the NF includes: verifying, by the NRF, whether the service name of the NF in the complete domain name of the first service is the same as the service name of the NF carried in the extension field of the digital certificate, and if yes, succeeding in the registration and storing a correspondence among the complete domain name of the first service, the first service address, the service name list on which the NF relies and that is carried in the extension field of the digital certificate, and the service name list that relies on the NF.

In an example implementation, the management domain name of the NF is dynamically generated by a management network element based on the network slice identifier, and is injected by a platform as a service (PaaS) in an image of the NF in a process in which the management network element requests the PaaS to deploy the NF in a network slice, and the digital certificate of the NF is injected in the image of the NF in the process in which the management network element requests the PaaS to deploy the NF in the network slice.

In an example implementation, the management domain name of the NF and the digital certificate of the NF are configured after the NF is started.

According to a second aspect, this application provides an NF service discovery method, including: obtaining, by the NF, a management domain name of an NF and a digital certificate of the NF, where the digital certificate of the NF carries a service name of the NF, a service name list on which the NF relies, and a service name list that relies on the NF, and the management domain name of the NF includes a network slice identifier of a network slice and a network identifier of a network to which the network slice belongs; establishing, by the NF, a communication connection to an NRF, and sending the digital certificate of the NF to the NRF in a transport layer security TLS protocol or datagram transport layer security DTLS protocol two-way authentication process; sending, by the NF to the NRF, a query request for querying an address of a target service, where the query request carries a complete domain name of the target service, and the complete domain name of the target service is a domain name formed by a service name of the target service and a management domain name of the NF, or the complete domain name of the target service is a domain name formed by a service name of the target service and a management domain name of an NF in which the target service queried by the NF is located, so that the NRF performs verification based on the service name of the target service and the digital certificate of the NF.

According to the second aspect, the NF service discovery method is provided, to discover the NF services. In addition, in a process of discovering the NF service, a service name of a target service is known by an NF. If service discovery is performed within a network slice, the NF queries a complete domain name of the target service formed by the service name of the target service and a management domain name of the NF when sending a query request. If the service discovery is performed between different network slices, the NF queries the complete domain name of the target service formed by the service name of the target service and the management domain name of the NF in which the target service queried by the NF is located when sending the query request. The management domain name of the NF includes the network slice identifier and the identifier of the network to which the network slice belongs, and the network slice identifier is managed by a management network element. Therefore, the NF decouples from the network slice. In addition, a relying relationship between different services is placed in an extension field of the digital certificate of a service. The extension field of the digital certificate only relates to the service name of the NF, and does not relate to the management domain name of the NF, thereby ensuring that the digital certificate of all services does not need to be updated due to a dynamically deployed slice, so as to decouple the NF from a service security mechanism. The network slice and the service security mechanism can be compatible with an existing TLS/DNS standard mechanism, and the existing NF can access a system without modification. Regardless of how the NF is dynamically deployed, the existing NF is not affected.

In an example implementation, before the sending, by an NF to an NRF, a query request for querying an address of a target service, the method further includes: forming, by the NF, the complete domain name of the target service based on the service name of the target service and the management domain name of the NF.

In an example implementation, before the sending, by the NF to the NRF, a query request for querying an address of a target service, the method further includes: sending, by the NF to a management network element, a query request for querying the management domain name of the NF in which the target service is located, where the query request carries the service name of the target service; and after receiving the management domain name of the NF in which the target service is located that is sent by the management network element, forming, by the NF, the complete domain name of the target service based on the service name of the target service and the management domain name of the NF in which the target service is located.

In an example implementation, the method further includes: receiving, by the NF, the address of the target service sent by the NRF when the verification succeeds.

In an example implementation, before the sending, by the NF to the NRF, a query request for querying an address of a target service, the method further includes: forming, by the NF, a complete domain name of a first service based on the service name of the NF and the management domain name of the NF, and sending a first service registration request to the NRF, where the first service registration request includes the complete domain name of the first service and a first service address, so that the NRF performs service registration based on the complete domain name of the first service and the service name of the NF that is carried in the extension field of the digital certificate of the NF.

The methods provided in this implementation implement the registration of the NF service.

In an example implementation, the management domain name of the NF is dynamically generated by a management network element based on the network slice identifier, and is injected by a platform as a service (PaaS) in an image of the NF in a process in which the management network element requests the PaaS to deploy the NF in a network slice, and the digital certificate of the NF is injected in an image of the NF in the process in which the management network element requests the PaaS to deploy the NF in the network slice.

In an example implementation, the management domain name of the NF and the digital certificate of the NF are configured after the NF is started.

According to a third aspect, this application provides an NRF, including: an obtaining module, configured to obtain a digital certificate of an NF in a transport layer security TLS protocol or datagram transport layer security DTLS protocol two-way authentication process after establishing a communication connection to the NF, where the digital certificate of the NF carries a service name of the NF, a service name list on which the NF relies, and a service name list that relies on the NF; a receiving module, configured to receive a query request that is for querying an address of a target service and that is sent by the NF, where the query request carries a complete domain name of the target service, the complete domain name of the target service is a domain name formed by a service name of the target service and a management domain name of the NF, or the complete domain name of the target service is a domain name formed by a service name of the target service and a management domain name of an NF in which the target service queried by the NF is located, and the management domain name of the NF includes a network slice identifier of a network slice and an identifier of a network to which the network slice belongs; and a verification module, configured to perform verification based on the service name of the target service and the digital certificate of the NF, and send the address of the target service to the NF when the verification succeeds.

In an example implementation, the verification module is configured to: verify whether the service name of the target service is in the service name list on which the NF relies and that is carried in an extension field of the digital certificate of the NF, and whether the service name of the NF is included in the service name list that relies on the NF, that is carried in the extension field of the digital certificate, and that is corresponding to the complete domain name of the target service that has been registered and stored.

In an example implementation, the receiving module is further configured to: before receiving the query request that is for querying an address of a target service and that is sent by the NF, receive a first service registration request sent by the NF, where the first service registration request includes a complete domain name of a first service and a first service address, and the complete domain name of the first service is a domain name formed by the service name of the NF and the management domain name of the NF; and the NRF further includes: a registration module, configured to perform service registration based on the complete domain name of the first service and the service name of the NF that is carried in the extension field of the digital certificate of the NF.

In an example implementation, the registration module is configured to: verify whether the service name of the NF in the complete domain name of the first service is the same as the service name of the NF carried in the extension field of the digital certificate, and if yes, succeed in the registration and store a correspondence among the complete domain name of the first service, the first service address, the service name list on which the NF relies and that is carried in the extension field of the digital certificate, and the service name list that relies on the NF.

In an example implementation, the management domain name of the NF is dynamically generated by a management network element based on the network slice identifier, and is injected by a platform as a service (PaaS) in an image of the NF in a process in which the management network element requests the PaaS to deploy the NF in the network slice, and the digital certificate of the NF is injected in the image of the NF in the process in which the management network element requests the PaaS to deploy the NF in the network slice.

In an example implementation, the management domain name of the NF and the digital certificate of the NF are configured after the NF is started.

For beneficial effects of the NRF provided in the third aspect and the example implementations of the third aspect, refer to the beneficial effects brought by the foregoing first aspect and the example implementations of the first aspect, and details are not described herein again.

According to a fourth aspect, this application provides an NF, including: an obtaining module, configured to obtain a management domain name of an NF and a digital certificate of the NF, where the digital certificate of the NF carries a service name of the NF, a service name list on which the NF relies, and a service name list that relies on the NF, and the management domain name of the NF includes a network slice identifier of a network slice and an identifier of a network to which the network slice belongs; a first sending module, configured to establish a communication connection to an NRF, and send the digital certificate of the NF to the NRF in a transport layer security TLS protocol or datagram transport layer security DTLS protocol two-way authentication process; and a query module, configured to send a query request for querying an address of a target service to the NRF, where the query request carries a complete domain name of the target service, and the complete domain name of the target service is a domain name formed by a service name of the target service and a management domain name of the NF, or the complete domain name of the target service is a domain name formed by a service name of the target service and a management domain name of an NF in which the target service queried by the NF is located, so that the NRF performs verification based on the service name of the target service and the digital certificate of the NF.

In an example implementation, the query module is further configured to: before sending the query request for querying the address of the target service to the NRF, form the complete domain name of the target service based on the service name of the target service and the management domain name of the NF.

In an example implementation, the query module is further configured to: before sending the query request for querying the address of the target service to the NRF, send a query request for querying the management domain name of the NF in which the target service is located to a management network element, where the query request carries the service name of the target service; and after receiving the management domain name of the NF in which the target service is located that is sent by the management network element, form the complete domain name of the target service based on the service name of the target service and the management domain name of the NF in which the target service is located.

In an example implementation, the NF further includes: a receiving module, configured to receive the address of the target service sent by the NRF when the verification succeeds.

In an example implementation, the query module is further configured to: before sending the query request for querying the address of the target service to the NRF, form a complete domain name of a first service based on the service name of the NF and the management domain name of the NF, and send a first service registration request to the NRF, where the first service registration request includes the complete domain name of the first service and a first service address, so that the NRF performs service registration based on the complete domain name of the first service and the service name of the NF that is carried in the extension field of the digital certificate of the NF.

In an example implementation, the management domain name of the NF is dynamically generated by a management network element based on the network slice identifier, and is injected by a platform as a service (PaaS) in an image of the NF in a process in which the management network element requests the PaaS to deploy the NF in a network slice, and the digital certificate of the NF is injected in an image of the NF in the process in which the management network element requests the PaaS to deploy the NF in the network slice.

In an example implementation, the management domain name of the NF and the digital certificate of the NF are configured after the NF is started.

For beneficial effects of the NRF provided in the fourth aspect and all example implementations of the fourth aspect, refer to beneficial effects brought by the foregoing second aspect and all example implementations of the second aspect.

According to a fifth aspect, this application provides an NRF, including: a memory and a processor, where the memory is configured to store a program instruction, and the processor is configured to invoke a program instruction in a memory to perform the NF service discovery method in any one of the first aspect and the example implementations of the first aspect.

According to a sixth aspect, this application provides an NF, including: a memory and a processor, where the memory is configured to store a program instruction, and the processor is configured to invoke a program instruction in a memory to perform the NF service discovery method in any one of the second aspect and the example implementations of the second aspect.

According to a seventh aspect, this application provides a readable storage medium, where the readable storage medium stores a computer program, and when at least one processor of a discovery device of an NF service executes the computer program, the discovery device of the NF service performs the NF service discovery method in any one of the first aspect or the example implementations of the first aspect or in any one of the second aspect or the example implementations of the second aspect.

According to an eighth aspect, this application provides a program product, where the program product includes a computer program, and the computer program is stored in a readable storage medium. At least one processor of a discovery device of an NF service may read the computer program from the readable storage medium, the at least one processor executes the computer program, so that the discovery device of the NF service performs the NF service discovery method in any one of the first aspect or the example implementations of the first aspect or the second aspect or the example implementations of the second aspect.

DESCRIPTION OF EMBODIMENTS

Network architectures and service scenarios described in this application are intended to describe technical solutions in this application more clearly, but are not intended to limit the technical solutions provided in this application. A person of ordinary skill in the art would know that as the network architectures evolve and new service scenarios emerge, the technical solutions provided in this application are also applicable to similar technical problems.

Network slicing is a set of logical network function instances that support a specific communication service requirement, and mainly uses a software-defined network (SDN) technology and a network function virtualization (NFV) technology. The NFV technology can map underlying physical resources to virtual resources, construct virtual machines, and load an NF. The SDN technology can implement a logical connection between the virtual machines and construct a path carrying signaling and a data flow. The network slicing implements a dynamic connection between NF instances in an access network (RAN) and a core network, and configures an end-to-end service chain, and implements flexible networking, so as to implement a customizable network service. An operator may determine a network slice based on requirements of specific communications service for key performance indicators such as a capacity, coverage, a rate, a latency, and reliability. The network slice includes an NF instance set and network resources required for running these NF instances, so that a required telecommunications service and a network capability service are provided for users, thereby meeting specific market scenarios and requirements.

It should be noted that, each network slice includes a group of NFs with a specific function. One NF includes at least one service. Each NF is a service provider, and provides an application programming interface (API) for other NFs to invoke. Each NF is also a service consumer and invokes the API of other NFs. Each service provider needs to register information (including a service address) on the NRF. When the NF invokes an NRF registration interface, the NF is a service registrant. When the NF invokes an NRF service discovery interface, the NF is a service discoverer. The discovery between the NFs is that the service consumer is able to query the registration information (such as the service address) of the service provider.

The technical solutions provided in embodiments of this application may be applied to a mobile communications system such as a 5G communications system or an LTE system, and are mainly applied to a scenario in which the NFs located in different network slices or a same network slice can be discovered from each other in an NF-centric service-based network architecture centered on the NF.

Figure 1:
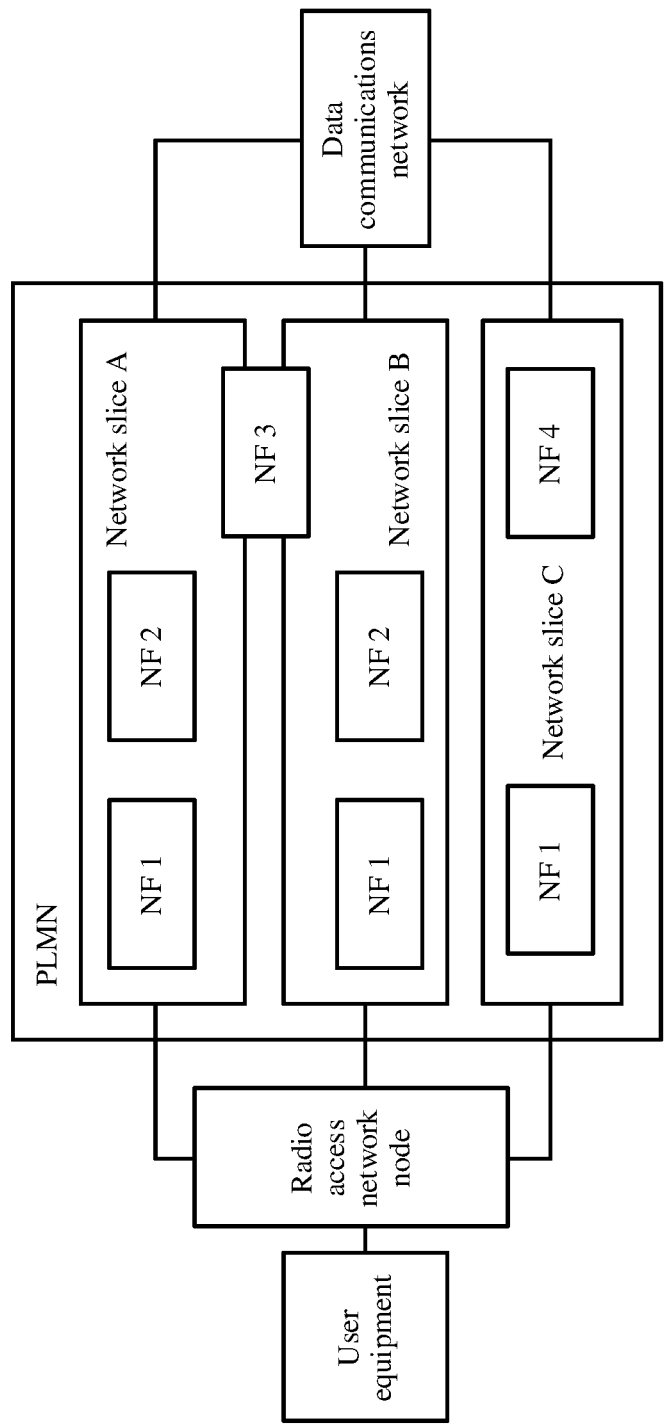
FIG. 1 is a schematic diagram of distribution of NFs of network slices and different network slices of a PLMN.
Figure 2:
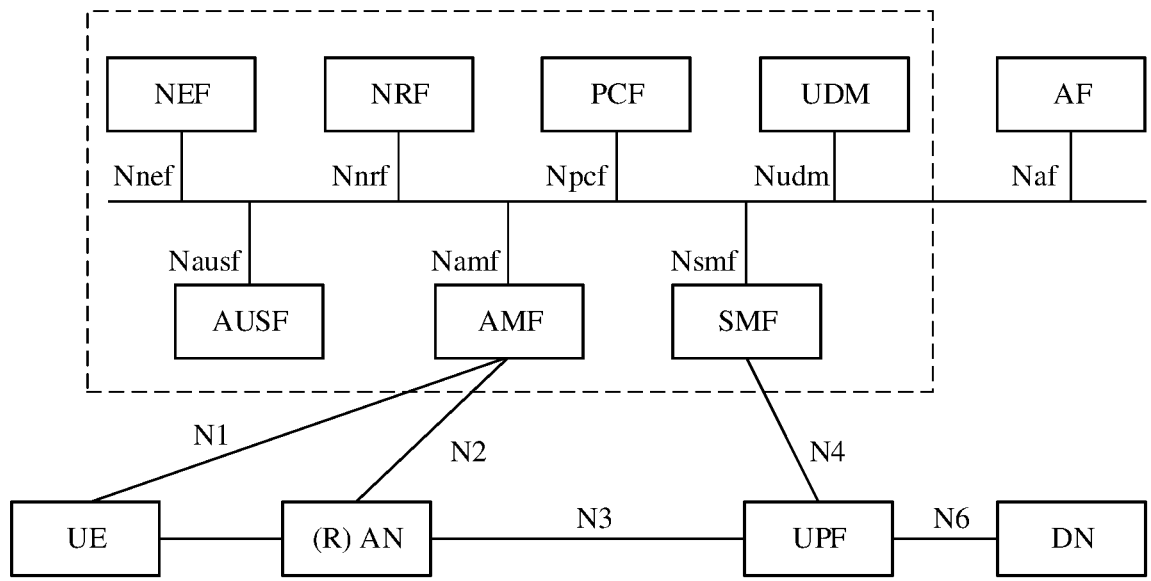
FIG. 2 is a schematic diagram of an example network architecture according to an embodiment of this application.

FIG. 2 is a schematic diagram of an example network architecture according to some embodiments of this application. FIG. 2 shows a network architecture of a core network. A network exposure function (NEF), a policy control function (PCF), unified data management (UDM), an application function (AF), an authentication server function (AUSF), an access and mobility management function (AMF), a session management function (SMF), and a user plan function (UPF) are all different NFs in FIG. 2. An NRF provides service registration and a service discovery function for all NFs, and the NF can register one or more service addresses on the NRF. All NFs are located in a fully interconnected network topology, so as to decouple physical deployment locations between specific services. N1, N2, N3, N4, and N6 are interfaces between network elements. APIs of the NFs are as follows: a service-based interface exhibited by the AMF (Namf), a service-based interface exhibited by the SMF (Nsmf), a service-based interface exhibited by the NEF (Nnef), a service-based interface exhibited by the NRF (Nnrf), a service-based interface exhibited by the PCF (Npcf), a service-based interface exhibited by the UDM (Nudm), a service-based interface exhibited by the AUSF (Nausf), and a service-based interface exhibited by the AF (Naf).

An Embodiment of this application provides an NF service discovery method and a device, so as to discover NF services located in different network slices or a same network slice. A service consumer can query registration information about a service provider, such as a service address. In one aspect of this application, a network slice identifier of a network slice is embedded into a complete domain name of a service, where the complete domain name of the service is formed by a service name of the NF and a management domain name of the NF, the management domain name of the NF includes the network slice identifier and an identifier of a network to which the network slice belongs, and a management network element manages the management domain name of the NF, in other words, the management network element manages the network slice identifier, so that the NF can decouple from the network slice. Decoupling means that the NF is not changed because a new network slice needs to be deployed. In addition, in a service-based network architecture, services are in a flat and fully interconnected simplified physical topology. A service communications security between the services needs to be guaranteed. A service security mechanism is mandatory. Usually, a security channel of a secure transport layer (TLS) protocol or a data secure transport layer protocol (DTLS) is used at a bottom layer. After the NF establishes a communication connection to the NRF, authentication is performed between the NF and the NRF via a TLS or DTLS two-way authentication process to meet a security requirement. In the TLS two-way authentication process, the NF sends a digital certificate of the NF to the NRF. In this embodiment, a security rule of an NF service discovery is placed in an extension field of a digital certificate of the service, where the security rule is a relying relationship between different services. The extension field of the digital certificate only relates to a service name of the NF (for example, <NF service>.<NF name>), and does not relate to the management domain name of the NF (such as <Slice id>.<PLMN>), thereby ensuring that the digital certificate of all services does not need to be updated due to a dynamically deployed slice, so as to decouple the NF form the service security mechanism. The network slice and the service security mechanism may be compatible with an existing TLS/domain name system (DNS) standard mechanism, and an existing NF can access the system without modification. The following describes the technical solutions of this application in detail with reference to the accompanying drawings.

Figure 3:
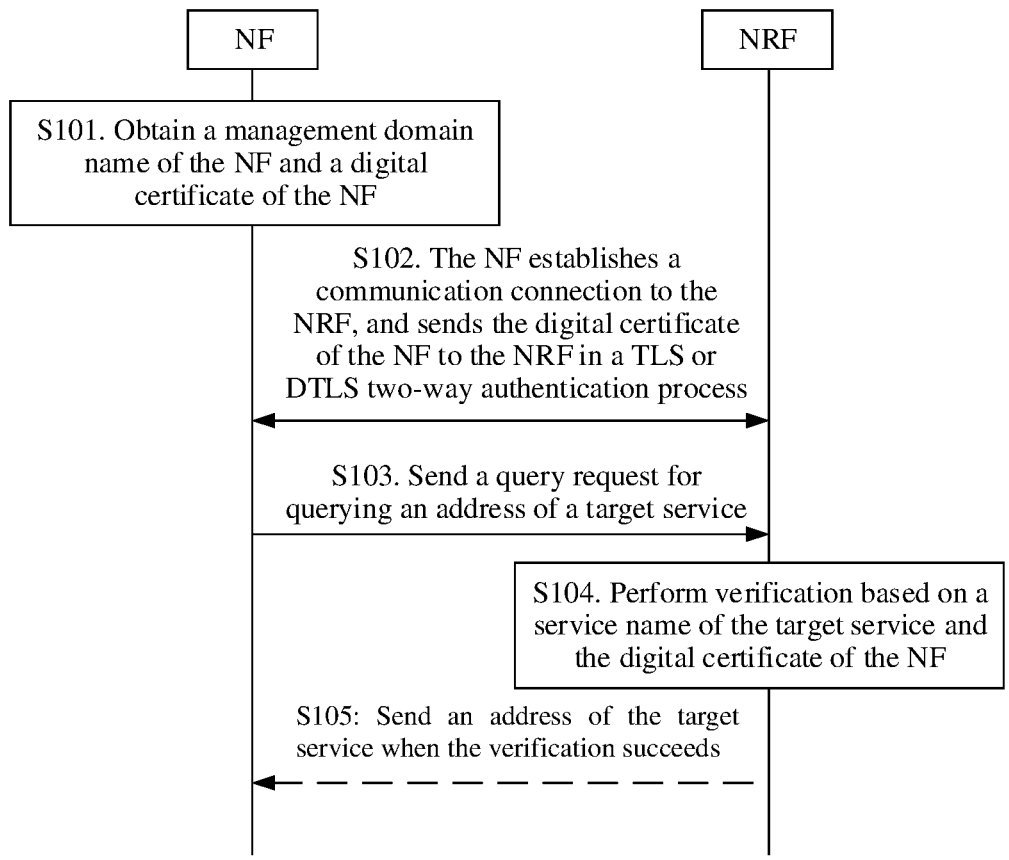
FIG. 3 is a flowchart of an embodiment of an NF service discovery method according to an embodiment of this application.

FIG. 3 is a flowchart of an example NF service discovery method according to an embodiment of this application. As shown in FIG. 3, the method in this embodiment may include the following steps.

S101. An NF obtains a management domain name of the NF and a digital certificate of the NF, where an extension field of the digital certificate of the NF carries a service name of the NF, a service name list on which the NF relies, and the service name list that relies on the NF, and the management domain name of the NF includes a network slice identifier of a network slice and an identifier of a network to which the network slice belongs.

The management domain name of the NF is, for example, <Slice id>.<PLMN>, the Slice id is the network slice identifier, and the PLMN is the identifier of the network to which the network slice belongs. Specifically, the NF obtains the management domain name of the NF, the digital certificate of the NF, and an address of an NRF that provides service registration and a service discovery function for the NF. Usually, one NRF manages the NFs in a same network slice, or one NRF manages the NFs in a plurality of different network slices. Optionally, three pieces of information, namely, the management domain name of the NF, the digital certificate of the NF, and the address of the NRF may be injected in an image of the NF and stored in a disk file in a process of deploying the NF in the network slice. Specifically, the management domain name of the NF is dynamically generated by a management network element based on the network slice identifier, and is injected by a platform as a service (PaaS) in the image of the NF in a process in which the management network element requests the PaaS to deploy the NF in the network slice. The digital certificate of the NF and the address of the NRF are injected in the image of the NF in the process in which the management network element requests the PaaS to deploy the NF in the network slice. In this case, the NF may obtain the three pieces of information by reading a system name server configuration file (the disk file), and the management network element may be a network slice management function (NSMF) or an operations support system (OSS). Optionally, the three pieces of information may further be configured after the NF is started, and the NF obtains the three pieces of information by reading the configuration file.

The digital certificate of the NF is in a one-to-one correspondence with a type of NF. NFs of a same type have same digital certificates, and a plurality of instances of a same type of NF use a same digital certificate. The service name list on which the NF relies may include one or more service names, and the service name list that relies on the NF may include one or more service names.

The service name list on which the NF relies refers to a target service name list in which the NF, as a service consumer, needs to query a service address by using the NRF. The service name list that relies on the NF refers to a service name list of all service consumers that can be obtained by the service consumers from the service address of the NRF registered by the NF as a service provider.

S102. The NF establishes a communication connection to the NRF, and sends the digital certificate of the NF to the NRF in the TLS or DTLS two-way authentication process.

The NF establishes a communication connection to the NRF based on the address of the NRF. The TLS or DTLS two-way authentication process may be initiated by the NF or the NRF. For example, the NF initiates the TLS two-way authentication process. The NF sends a TLS handshake message to the NRF. After receiving the TLS handshake message, the NRF sends the TLS handshake message to the NF, so as to indicate that client authentication is performed. Then the NF sends the digital certificate of the NF to the NRF. The TLS or DTLS two-way authentication process is an existing security authentication process, and a detailed process is not described herein again.

S103. The NF sends a query request for querying an address of a target service to the NRF, where the query request carries a complete domain name of the target service, and the complete domain name of the target service is a domain name formed by a service name of the target service and a management domain name of the NF, or the complete domain name of the target service is a domain name formed by a service name of the target service and a management domain name of an NF in which the target service queried by the NF is located.

Optionally, before S103, the method may further include: forming, by the NF, the complete domain name of the target service based on the service name of the target service and the management domain name of the NF.

The service name of the target service is, for example, <NF service name>.<NF name> (the NF in which the target service is located has a plurality of services), and the complete domain name of the target service is <NF service name>.<NF name>.<Slice id>.<PLMN>. Alternatively, the service name of the target service is, for example, <NF name> (the NF in which the target service is located has only one target service), and the complete domain name of the target service is <NF name>.<Slice id>.<PLMN>.

The complete domain name of the target service is a domain name formed by the service name of the target service and the management domain name of the NF. In this case, the NF and the NF in which the target service is located belong to the same network slice. The complete domain name of the target service is a domain name formed by the service name of the target service and the management domain name of the NF in which the target service queried by the NF is located. In this case, the NF and the NF in which the target service is located belong to different network slices.

When the NF and the NF in which the target service is located belong to different network slices, to be specific, when service discovery is performed between different network slices, before S103, the method may further include:

sending, by the NF to a management network element, a query request for querying the management domain name of the NF in which the target service is located, where the query request carries the service name of the target service.

The query request may carry the service name of the target service, for example, <NF service name>.<NF 1 name>. The management network element may query, based on the service name of the target service, that the NF in which the target service is located is an NF 1, and may query a target network slice in which the NF 1 is located, so as to query the management domain name of the NF in which the target service is located. For example, the management network element is an NSMF.

After receiving the management domain name of the NF in which the target service is located that is sent by the management network element, the NF forms the complete domain name of the target service based on the service name of the target service and the management domain name of the NF in which the target service is located.

S104. The NRF performs verification based on the service name of the target service and the digital certificate of the NF.

S105. The NRF sends the address of the target service to the NF when the verification succeeds.

Alternatively, when the verification fails, the NRF sends a query failure message to the NF.

Optionally, the performing, by the NRF in S104, the verification based on the service name of the target service and the digital certificate of the NF may specifically include:

verifying, by the NRF, whether the service name of the target service is in the service name list on which the NF relies and that is carried in an extension field of the digital certificate of the NF, and whether the service name of the NF is included in the service name list that relies on the NF, that is carried in the extension field of the digital certificate, and that corresponds to the complete domain name of the target service that has been registered and stored. If yes, the verification succeeds. If not, the verification fails.

For example, an extension field of a digital certificate of the NF 1 carries the following content: The service name of the NF is *.NF1, a service name on which the NF 1 relies is *.NF2, and the service name that the NF 1 relies is *.NF3. An extension field of a digital certificate of the NF 2 carries the following content: The service name of the NF is *.NF2, a service name on which the NF 2 relies is *.NF4, and the service name that the NF 2 relies is *.NF1. An extension field of a digital certificate of the NF 3 carries the following content: The service name of the NF is *.NF3, a service name on which the NF 3 relies is *.NF2, and the service name that the NF 3 relies is *.NF4.

The NF 1 can query a service address registered by the NF 2. The NF 1 is rejected by the NRF when querying a service address of the NF 3 because the service name on which the digital certificate of the NF 1 relies does not include the NF 3. The NF 3 is rejected by the NRF when querying a service address of the NF 2 because the service name that the digital certificate of the NF 2 relies does not include the NF 3.

The foregoing process is a discovery process of an NF service. It may be understood that, before the discovery between the NF services, registration is required, and the NF may register one or more service addresses on the NRF. Based on the embodiment shown in FIG. 3, before S103, the method may further include:

forming, by the NF, a complete domain name of a first service based on the service name of the NF and the management domain name of the NF, and sending a first service registration request to the NRF, where the first service registration request includes the complete domain name of the first service and a first service address. The first service address may be an IP address or a URL address.

After receiving the first service registration request, the NRF performs service registration based on the complete domain name of the first service and the service name of the NF that is carried in the extension field of the digital certificate of the NF.

Specifically, the NRF verifies whether the service name of the NF in the complete domain name of the first service is the same as the service name of the NF carried in the extension field of the digital certificate, and if yes, succeeds in the registration and stores a correspondence among the complete domain name of the first service, the first service address, the service name list on which the NF relies and that is carried in the extension field of the digital certificate, and the service name list that relies on the NF. If no, the registration fails. When the registration succeeds, for example, a stored correspondence is shown in the following Table 1:

TABLE 1

| Complete domain name of the first service | First service address | Service name list on which the NF relies and that is carried in the extension field of the digital certificate | Service name list that relies on the NF that is carried in the extension field of the digital certificate |
|---|---|---|---|
| <NF1service A name>.<NF1 name>.<Slice id>.<PLMN> | IP address of the first service A | <NF2service B name>.<NF2 name>, <NF2service C name>.<NF2 name>, <NF2service D name>.<NF2 name> | <NF3service E name>.<NF3 name>, <NF3service F name>.<NF3 name>, <NF3service H name>.<NF3 name> |

According to the NF service discovery method in this embodiment, the NF obtains the management domain name of the NF and the digital certificate of the NF, then establishes the communication connection to the NRF, and sends the digital certificate of the NF to the NRF via the TLS or DTLS two-way authentication process. The NF sends a query request for querying an address of a target service to the NRF, where the query request carries a complete domain name of the target service formed by a service name of the target service and the management domain name of the NF. Finally, the NRF performs verification based on the service name of the target service and the digital certificate of the NF, and sends the address of the target service to the NF when the verification succeeds. In this way, the discovery between the NF services is implemented. In addition, in a process of discovering the NF service, the service name of the target service is known by the NF. If the service discovery is performed within a network slice, the NF queries the complete domain name of the target service formed by the service name of the target service and the management domain name of the NF when sending a query request, and performs query. If the service discovery is performed between different network slices, the NF queries the complete domain name of the target service formed by the service name of the target service and the management domain name of the NF in which the target service queried by the NF is located when sending the query request. The management domain name of the NF includes the network slice identifier and the identifier of the network to which the network slice belongs, and the network slice identifier is managed by a management network element. Therefore, the NF can decouple from the network slice. In addition, a relying relationship between different services is placed in the extension field of the digital certificate of the service. The extension field of the digital certificate only relates to the service name of the NF, and does not relate to the management domain name of the NF, thereby ensuring that digital certificate of all services does not need to be updated due to a dynamically deployed slice, so as to decouple the NF from a service security mechanism. The network slice and the service security mechanism may be compatible with an existing TLS/DNS standard mechanism, and an existing NF can access the system without modification. Regardless of how the NF is dynamically deployed, the existing NF is not affected.

The following describes the technical solutions of the method embodiment shown in FIG. 3 in detail by using several specific embodiments.

Figure 4:
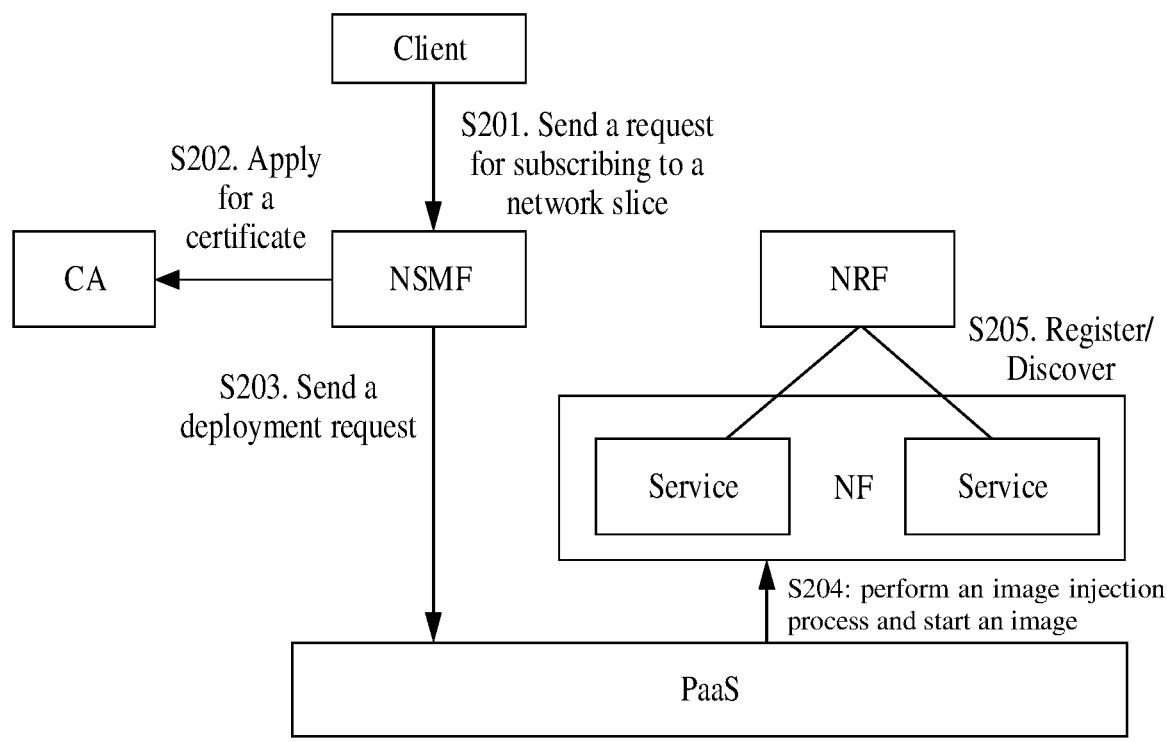
FIG. 4 is a schematic flowchart of subscribing to a slice by a client, generating a digital certificate, deploying an NF in the network slice, and registering and discovering a service, according to an embodiment of this application.

The following uses an example in which three pieces of information, namely, the management domain name of the NF, the digital certificate of the NF, and the address of the NRF are injected in the image in a process of deploying the NF in the network slice, to describe a service deployment process, a service registration process, and a service discovery process in detail. FIG. 4 is a schematic flowchart of subscribing to a slice by a client, generating a digital certificate, deploying an NF in the network slice, and registering and discovering a service. As shown in FIG. 4, the process includes the following steps.

S201. The client sends a request for subscribing to a network slice to an NSMF.

S202. After receiving the request, the NSMF applies to a digital certificate authority (CA) for a digital certificate.

S203. The NSMF sends a deployment request to a PaaS.

S204. The PaaS performs an image injection process, and starts an image.

S205. The NF performs service registration and service discovery on an NRF.

Figure 5:
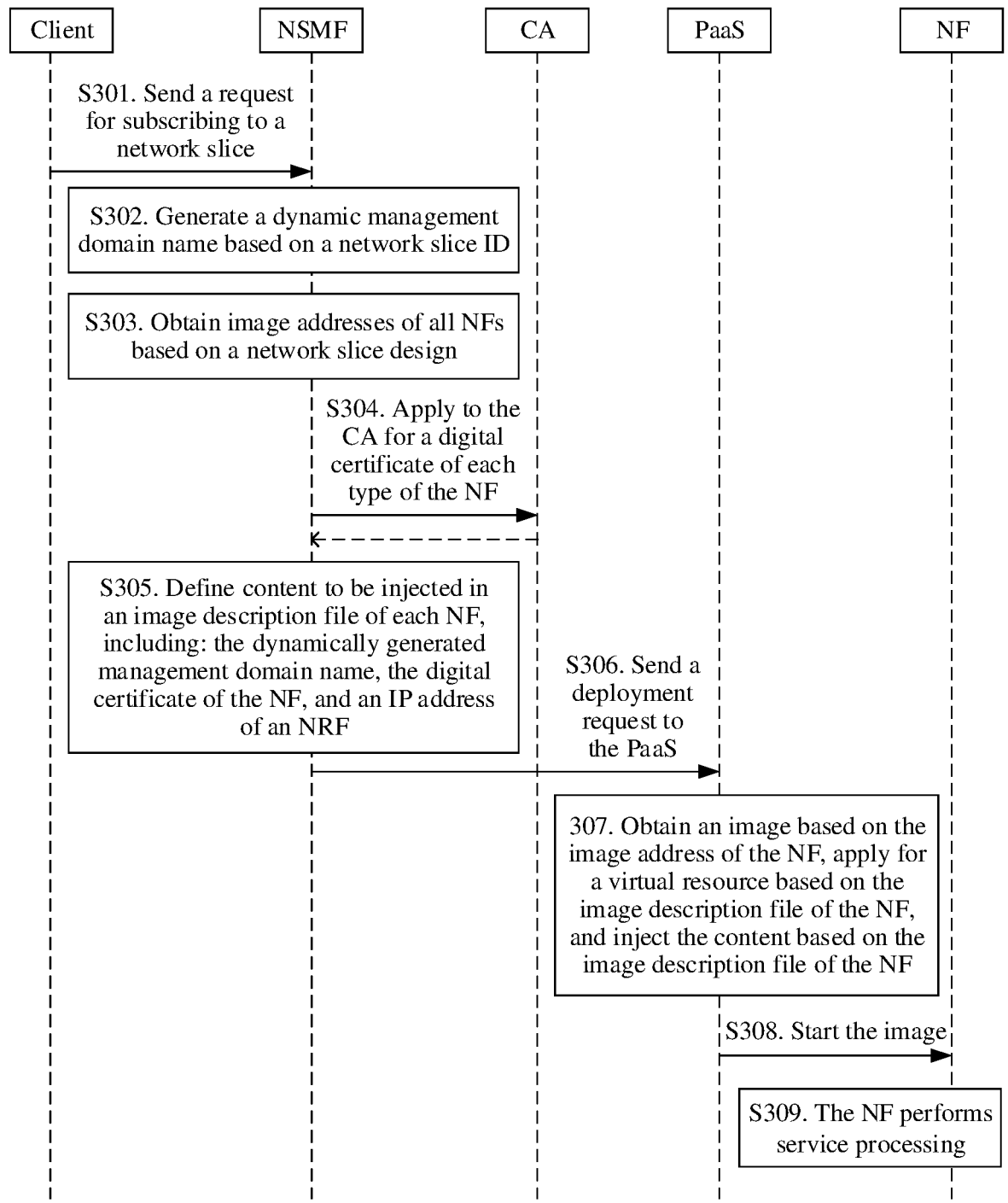
FIG. 5 is an interactive flowchart corresponding to FIG. 4.

FIG. 5 is an example interactive flowchart corresponding to FIG. 4. As shown in FIG. 5, the example method includes the following steps.

S301. The client sends the request for subscribing to the network slice to the NSMF.

S302. After receiving the request, the NSMF generates, based on a network slice identifier (ID), a dynamic management domain name <Slice id>.<PLMN>.

S303. The NSMF obtains, based on a network slice design, image addresses of all NFs within the network slice corresponding to the network slice ID.

S304. Apply to the CA for a digital certificate of each type of the NF.

The digital certificate of the NF is in a one-to-one correspondence with the type of the NF. The digital certificate of a same type of the NF is the same, and a plurality of instances of the same type of the NF use a same digital certificate.

S305. The NSMF defines the content that needs to be injected in an image description file of each NF, including: the dynamically generated management domain name, the digital certificate of the NF, and an IP address of the NRF.

S306. The NSMF sends the deployment request to the PaaS, where the deployment request carries the image address of the NF and the image description file of the NF.

S307. The PaaS obtains an image based on the image address of the NF, applies for a virtual resource based on the image description file of the NF, and injects the content based on the image description file of the NF.

S308. The PaaS starts the image.

S309. The NF performs service processing, and performs the service registration and the service discovery on the NRF.

An image injection technology is a basic function provided by all cloud platforms. To be specific, the PaaS may modify the file content of a specified directory in the image before the PaaS starts the image. Certainly, the PaaS may add a file to the specified directory.

Figure 6:
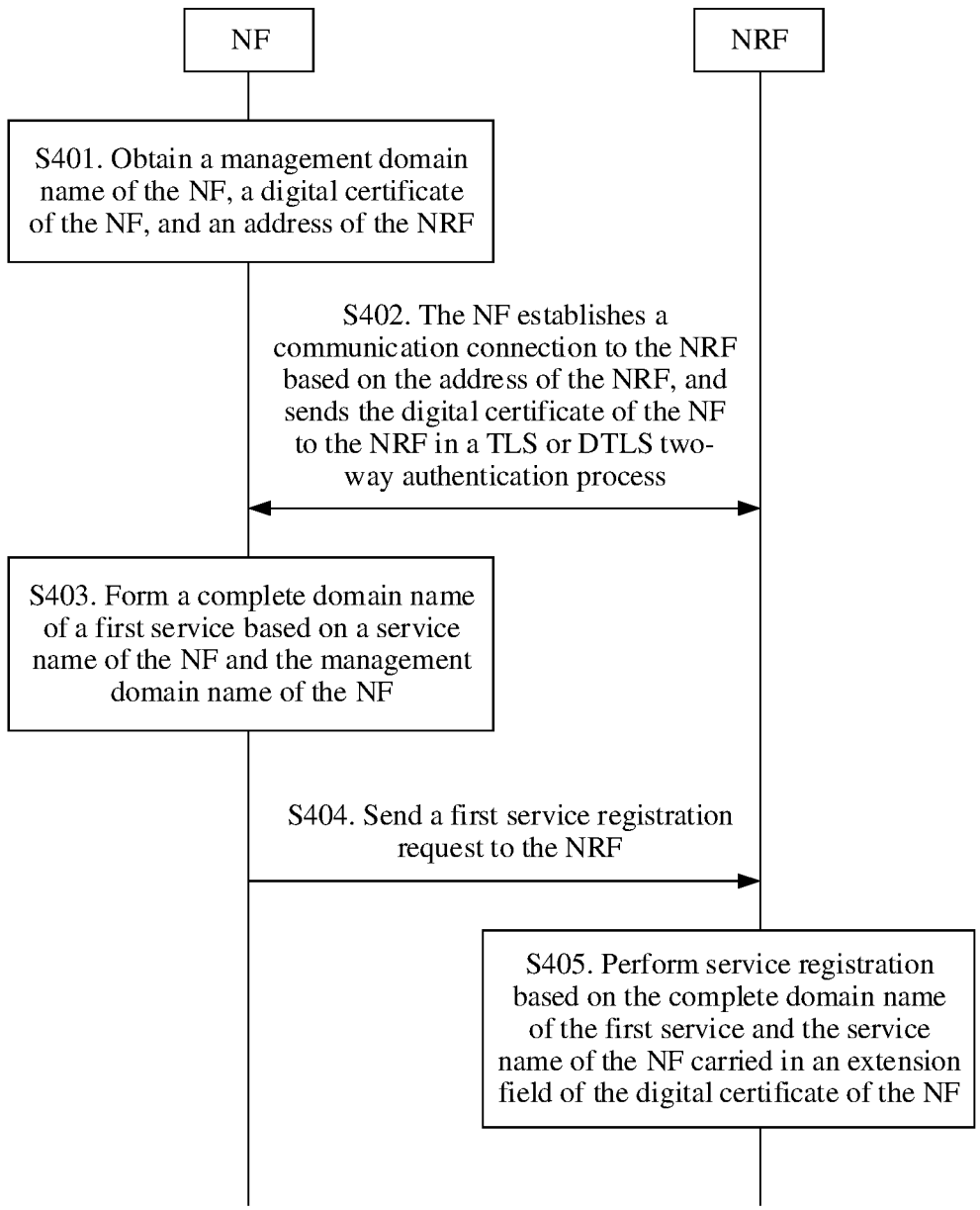
FIG. 6 is a flowchart of an example NF service registration method according to an embodiment of this application.

The following is an example service registration process. FIG. 6 is an example flowchart of an example NF service registration method according to an embodiment of this application. As shown in FIG. 6, the method in this embodiment includes the following steps.

S401. The NF obtains the management domain name of the NF, the digital certificate of the NF, and the address of the NRF, where the extension field of the digital certificate of the NF carries the service name of the NF, the service name list on which the NF relies, and the service name list that relies on the NF, and the management domain name of the NF includes the network slice identifier and the identifier of the network to which the network slice belongs.

Specifically, the NF obtains the three pieces of information, namely, the management domain name of the NF, the digital certificate of the NF, and the address of the NRF by reading a system name server configuration file (that is, the file injected by the NSMF in the image).

S402. The NF establishes the communication connection to the NRF based on the address of the NRF, and sends the digital certificate of the NF to the NRF in the TLS or DTLS two-way authentication process.

S403. The NF forms a complete domain name of the first service based on the service name of the NF and the management domain name of the NF.

S404. The NF sends a first service registration request to the NRF, where the first service registration request includes the complete domain name of the first service and a first service address.

S405. After receiving the first service registration request, the NRF performs the service registration based on the complete domain name of the first service and the service name of the NF that is carried in the extension field of the digital certificate of the NF.

For an example registration process, refer to description of the registration process in the embodiment shown in FIG. 3, and details are not described herein again.

Figure 7:
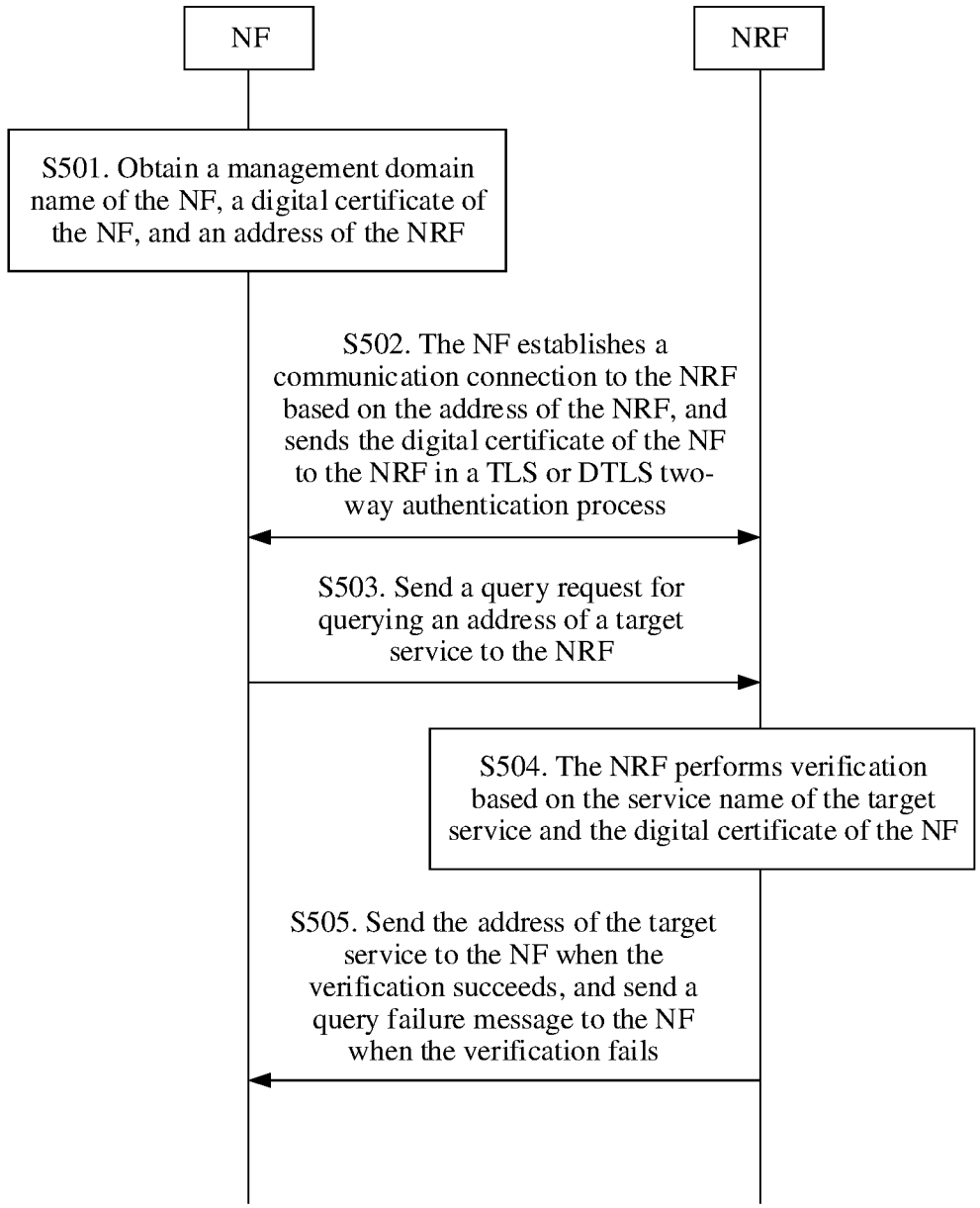
FIG. 7 is a flowchart of an example NF service discovery method according to an embodiment of this application.

The following is an example service discovery process. FIG. 7 is a flowchart of an example NF service discovery method according to an embodiment of this application. In this embodiment, discovery between NF services located in a same network slice is used as an example. As shown in FIG. 7, the method in this embodiment includes the following steps.

A process of S501 and S502 is the same as the process of S401 and S402 shown in FIG. 6, and details are not described herein again.

S503. The NF sends a query request for querying an address of the target service to the NRF, where the query request carries the complete domain name of the target service, and the complete domain name of the target service is a domain name formed by the service name of the target service and the management domain name of the NF.

S504. The NRF performs verification based on the service name of the target service and the digital certificate of the NF.

S505. The NRF sends the address of the target service to the NF when the verification succeeds, and sends a query failure message to the NF when the verification fails.

Specifically, the NRF verifies whether the service name of the target service is in the service name list on which the NF relies and that is carried in the extension field of the digital certificate of the NF, and whether the service name of the NF is included in the service name list that relies on the NF, that is carried in the extension field of the digital certificate, and that is corresponding to the complete domain name of the target service that has been registered and stored. If yes, the verification succeeds. If not, the verification fails.

It should be noted that, because an NRF configuration is the name server address of the NF, the NRF configuration service supports implementing the service discovery by using the DNS protocol. To ensure security, a TLS-based DNS message interaction is required. For a non-TLS DNS message, a returned search fails unless a digital certificate of a registered server indicates that an address of the service provider can be obtained by any service consumer.

In this embodiment, the NF obtains the management domain name of the NF, the digital certificate of the NF, and the address of the NRF that provides service registration and a service discovery function for the NF, then establishes the communication connection to the NRF based on the address of the NRF, and sends the digital certificate of the NF to the NRF via the TLS or DTLS two-way authentication process. The NF sends the query request for querying the address of the target service to the NRF, where the query request carries the complete domain name of the target service formed by the service name of the target service and the management domain name of the NF. Finally, the NRF performs verification based on the service name of the target service and the digital certificate of the NF, and sends the address of the target service to the NF when the verification succeeds. In this way, the NF service located in the same network slice is discovered, and the NF decouples from the network slice, so that the NF decouples from a service security mechanism.

Figure 8A:
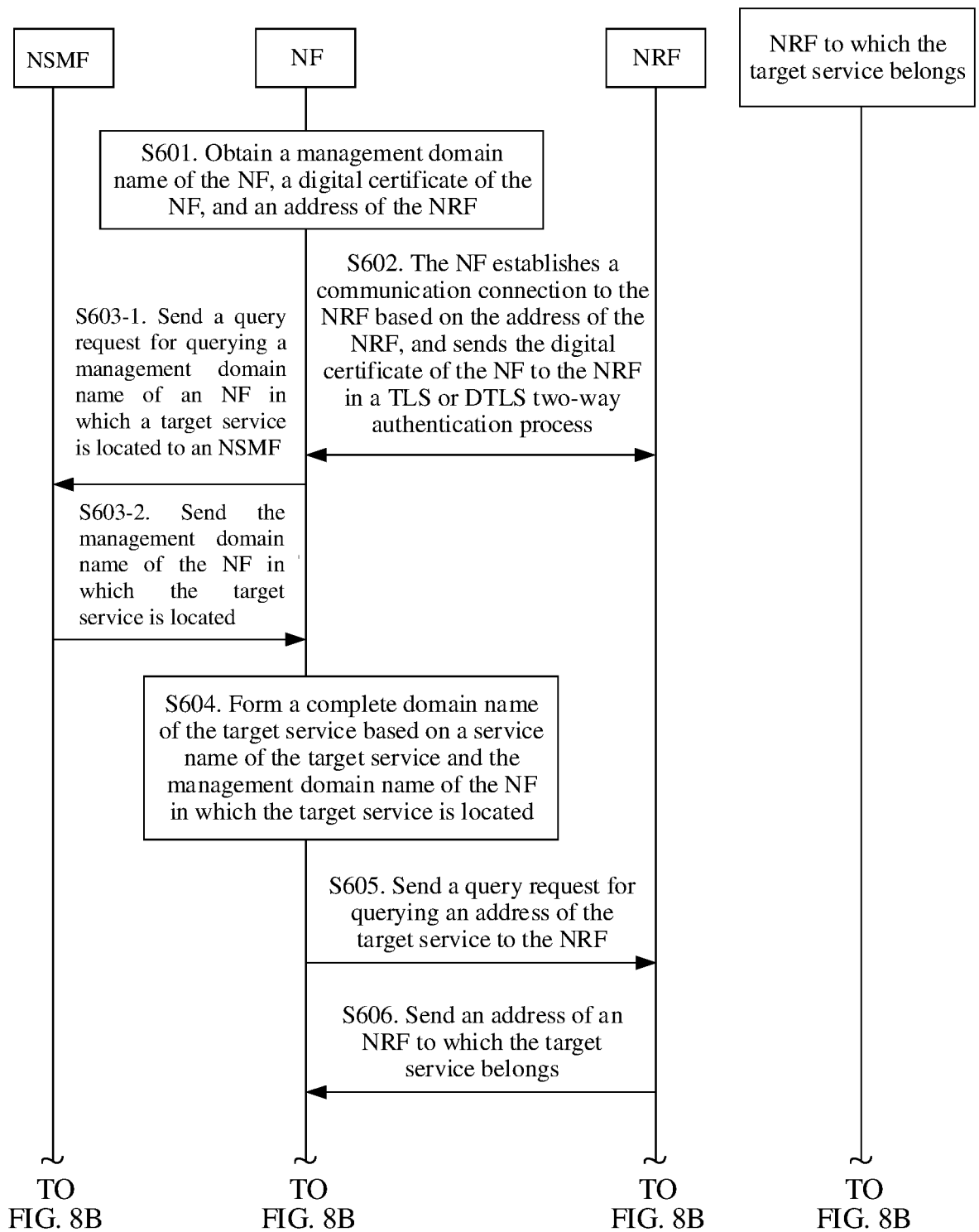
FIG. 8A and FIG. 8B are a flowchart of an example NF service discovery method according to an embodiment of this application.
Figure 8B:
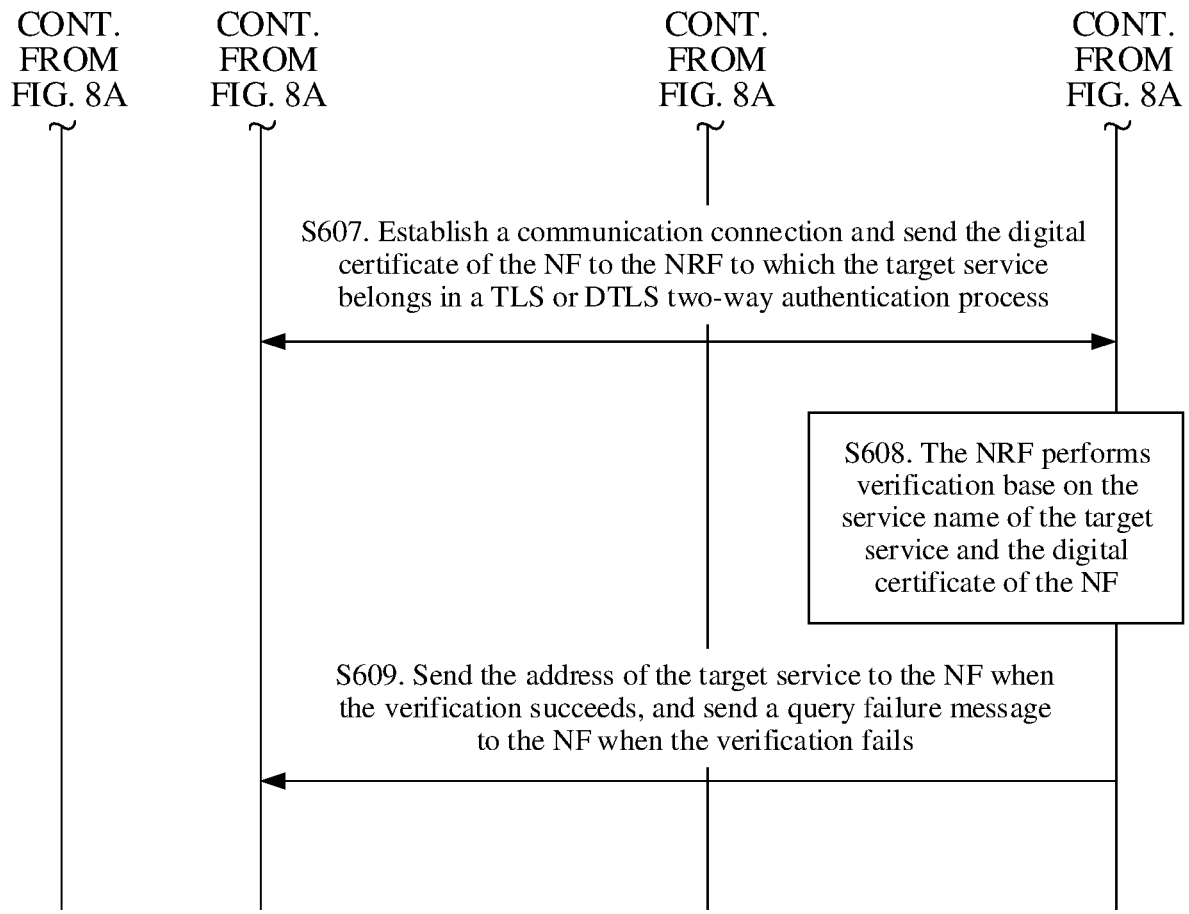

FIG. 8A and FIG. 8B are a flowchart of an example NF service discovery method according to an embodiment of this application. In this embodiment, discovery between NF services located on different network slices is used as an example, and a management network element is an NSMF. As shown in FIG. 8A and FIG. 8B, the method in this embodiment includes:

A process of S601 and S602 is the same as a process of S401 and S402 shown in FIG. 6, and details are not described herein again.

If customers of NF services are shared by a plurality of network slices, and the services of the plurality of network slices need to be discovered, a management domain name of each network slice is obtained by using a management channel, for example, the NSMF. To be specific, the management domain name of the NF is described above, for example, <Slice id>.<PLMN>. Then a complete domain name is formed by the management domain name of the NF and a service name of the services that needs to be discovered to the NRF to obtain the service address. The following describes the steps performed by the S603 and S604.

S603-1. The NF sends the query request for querying the management domain name of the NF in which the target service is located to the NSMF, where the query request carries the service name of the target service.

S603-2. The NSMF sends the management domain name of the NF in which the target service is located to the NF.

S604. After receiving the management domain name of the NF, in which the target service is located, sent by the NSMF, the NF forms the complete domain name of the target service based on the service name of the target service and the management domain name of the NF in which the target service is located.

S605. The NF sends a query request for querying the address of the target service to the NRF, where the query request carries the complete domain name of the target service.

When an NRF manages the NF in a same network slice, to be specific, a service consumer and a service discoverer may be located in different management domains, the method further includes the following steps.

S606. The NRF queries the address of the NRF to which the target service belongs, and sends the address of the NRF to which the queried target service belongs to the NF.

It should be noted that, because the service consumer and the service discoverer may be located in different management domains, the two management domains may be one NRF or may be two different NRFs. If the two different NRFs are used, an iterative query process of the DNS is similar to a process of the two different NRFs. After a plurality of iterative queries, a secure channel is finally established between the two different NRFs and the NRF of the management domain of the target service to discover the service. The process of discovering the NFs and other management domains of the RNFs is the same as the service discovery process in the network slice.

S607. The NF establishes, based on the address of the NRF to which the target service belongs, the communication connection to the NRF to which the target service belongs, and sends the digital certificate of the NF to the NRF in the TLS or DTLS two-way authentication process.

S608. The NRF to which the target service belongs performs verification based on a service name of the target service and the digital certificate of the NF.

S609. The NRF to which the target service belongs sends the address of the target service to the NF when the verification succeeds, and sends a query failure message to the NF when the verification fails.

Specifically, the NRF verifies whether the service name of the target service is in the service list on which the NF relies and that is carried in an extension field of the digital certificate of the NF, and whether the service name of the NF is included in the service name list that relies on the NF, that is carried in the extension field of the digital certificate, and that is corresponding to the complete domain name of the target service that has been registered and stored. If yes, the verification succeeds. If not, the verification fails.

In this embodiment, the NF obtains the management domain name of the NF and the digital certificate of the NF, then establishes the communication connection to the NRF, and sends the digital certificate of the NF to the NRF in the TLS or DTLS two-way authentication process, and the NF. The NF sends the query request for querying the management domain name of the NF in which the target service is located to the NSMF. After receiving the management domain name of the NF in which the target service is located that is sent by the NSMF, the NF forms the complete domain name of the target service based on the service name of the target service and the management domain name of the NF in which the target service is located. The NF sends the query request for querying the address of the target service to the NRF, where the query request carries the complete domain name of the target service. Finally, the NRF performs the verification based on the service name of the target service and the digital certificate of the NF, and sends the address of the target service to the NF when the verification succeeds. In this way, the NF service located in different network slices is discovered, and the NF decouples from the network slice, so that the NF decouples from a service security mechanism.

In embodiments of this application, functional modules may be defined for a discovery device (NF or NRF) of the NF service based on the foregoing example methods. For example, each functional module may be defined in a correspondence to each function. Alternatively, two or more functions may be integrated into one processing module. The integrated module may be implemented in a form of hardware, or may be implemented in a form of a software function module. It should be noted that, in the embodiments of this application, division into modules is used as an example and is merely logical function division. In actual implementation, another division manner may be used.

Figure 9:
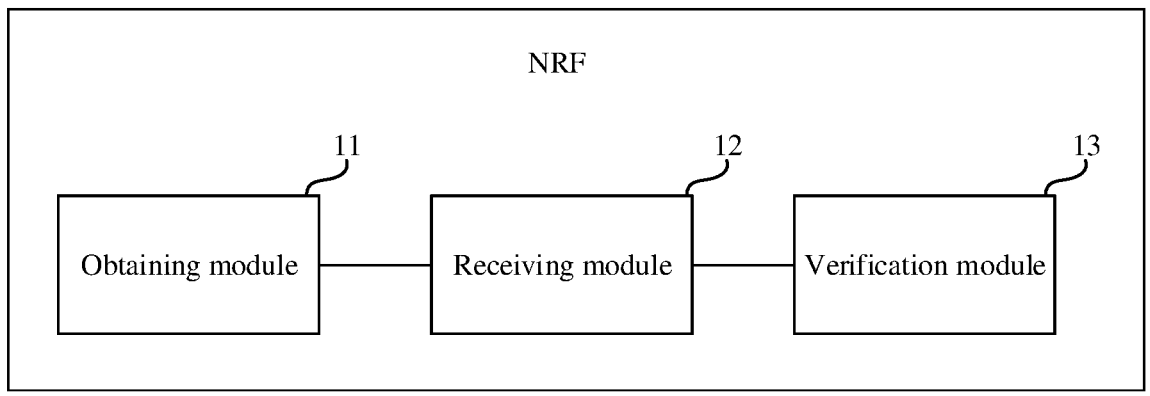
FIG. 9 is a schematic structural diagram of an example NRF according to an embodiment of this application.

FIG. 9 is a schematic structural diagram of an example NRF according to an embodiment of this application. As shown in FIG. 9, an NRF in this embodiment may include: an obtaining module 11, a receiving module 12, and a verification module 13. The obtaining module 11 is configured to obtain a digital certificate of an NF in the TLS or DTLS two-way authentication process after establishing a communication connection to the NF, where the digital certificate of the NF carries a service name of the NF, a service name list on which the NF relies, and a service name list that relies on the NF. The receiving module 12 is configured to receive a query request that is for querying an address of a target service and that is sent by the NF, where the query request carries a complete domain name of the target service, the complete domain name of the target service is a domain name formed by a service name of the target service and a management domain name of the NF, or the complete domain name of the target service is a domain name formed by a service name of the target service and a management domain name of an NF in which the target service queried by the NF is located, and the management domain name of the NF includes a network slice identifier of a network slice and an identifier of a network to which the network slice belongs. The verification module 13 is configured to perform verification based on the service name of the target service and the digital certificate of the NF, and send the address of the target service to the NF when the verification succeeds.

Optionally, the verification module 13 is configured to: verify whether the service name of the target service is in the service name list on which the NF relies and that is carried in an extension field of the digital certificate of the NF, and whether the service name of the NF is included in the service name list that relies on the NF, that is carried in the extension field of the digital certificate, and that is corresponding to the complete domain name of the target service that has been registered and stored.

The apparatus in this embodiment may be configured to execute the technical solutions in the method embodiment shown in FIG. 3, FIG. 7, or FIG. 8A and FIG. 8B, and implementation principles and technical effects of the apparatus are similar and are not described herein again.

Figure 10:
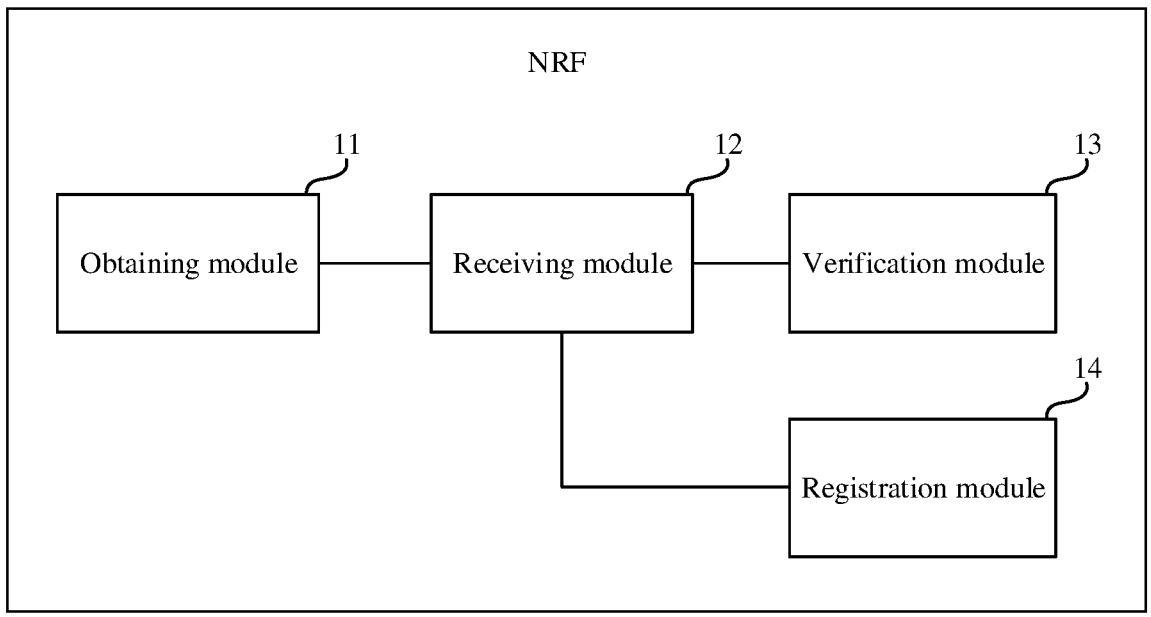
FIG. 10 is a schematic structural diagram of an example NRF according to an embodiment of this application.

FIG. 10 is a schematic structural diagram of an example NRF according to an embodiment of this application. As shown in FIG. 10, on the basis of the NRF shown in FIG. 9, alternatively, the NRF in this embodiment may further include a registration module 14, where the receiving module 12 is further configured to: before receiving the query request that is for querying the address of the target service and that is sent by the NF, receive a first service registration request sent by the NF, where the first service registration request includes a complete domain name of a first service and a first service address, and the complete domain name of the first service is a domain name formed by the service name of the NF and the management domain name of the NF. The registration module 14 is configured to perform service registration based on the complete domain name of the first service and the service name of the NF that is carried in the extension field of the digital certificate of the NF.

Optionally, the registration module 14 is configured to: verify whether the service name of the NF in the complete domain name of the first service is the same as the service name of the NF carried in the extension field of the digital certificate, and if yes, succeed in the registration and store a correspondence among the complete domain name of the first service, the first service address, the service name list on which the NF relies and that is carried in the extension field of the digital certificate, and the service name list that relies on the NF.

Optionally, the management domain name of the NF is dynamically generated by a management network element based on the network slice identifier, and is injected by a platform as a service (PaaS) in an image of the NF in a process in which the management network element requests the PaaS to deploy the NF in the network slice, and the digital certificate of the NF is injected in the image of the NF in the process in which the management network element requests the PaaS to deploy the NF in the network slice.

Optionally, the management domain name of the NF and the digital certificate of the NF are configured after the NF is started.

The apparatus in this embodiment may be configured to perform the technical solutions in the method embodiment shown in FIG. 6, and implementation principles and technical effects of the apparatus are similar and are not described herein again.

Figure 11:
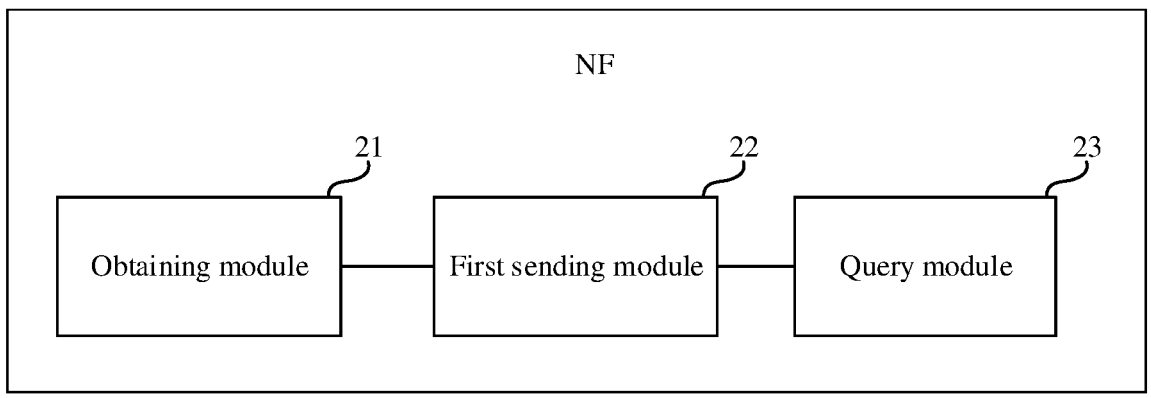
FIG. 11 is a schematic structural diagram of an example NF according to an embodiment of this application.

FIG. 11 is a schematic structural diagram of an example NF according to an embodiment of this application. As shown in FIG. 11, an NF in this embodiment may include: an obtaining module 21, a first sending module 22, and a query module 23. The obtaining module 21 is configured to obtain a management domain name of the NF and a digital certificate of the NF, where the digital certificate of the NF carries a service name of the NF, a service name list on which the NF relies, and a service name list that relies on the NF, and the management domain name of the NF includes a network slice identifier of a network slice and an identifier of a network to which the network slice belongs. The first sending module 22 is configured to establish a communication connection to an NRF, and send the digital certificate of the NF to the NRF via a transport layer security (TLS) protocol or datagram transport layer security (DTLS) protocol two-way authentication process. The query module 23 is configured to send a query request for querying an address of a target service to the NRF, where the query request carries a complete domain name of the target service, and the complete domain name of the target service is a domain name formed by a service name of the target service and a management domain name of the NF, or the complete domain name of the target service is a domain name formed by a service name of the target service and a management domain name of an NF in which the target service queried by the NF is located, so that the NRF performs verification based on the service name of the target service and the digital certificate of the NF.

Optionally, the query module 23 is further configured to: before sending the query request for querying the address of the target service to the NRF, from the complete domain name of the target service based on the service name of the target service and the management domain name of the NF.

Optionally, the query module 23 is further configured to: before sending the query request for querying the address of the target service to the NRF, send the query request for querying the management domain name of the NF in which the target service is located to a management network element, where the query request carries the service name of the target service; and after receiving the management domain name of the NF, in which the target service is located, that is sent by the management network element, form the complete domain name of the target service based on the service name of the target service and the management domain name of the NF in which the target service is located.

The apparatus in this embodiment may be configured to perform the technical solutions in the method embodiment shown in FIG. 3, FIG. 7, or FIG. 8A and FIG. 8B, and implementation principles and technical effects of the apparatus are similar and are not described herein again.

Figure 12:
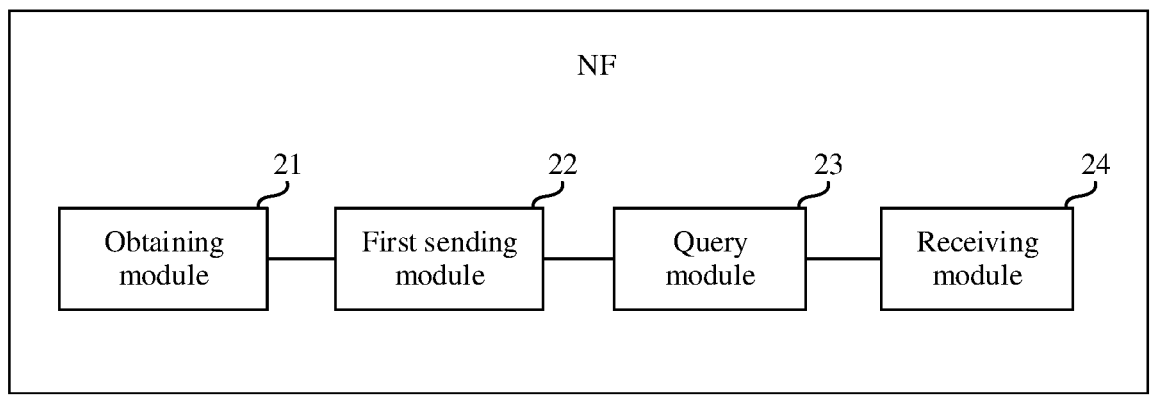
FIG. 12 is a schematic structural diagram of an example NF according to an embodiment of this application.

FIG. 12 is a schematic structural diagram of an example NF according to an embodiment of this application. As shown in FIG. 12, on the basis of the NF shown in FIG. 11, alternatively, the NF in this embodiment may further include a receiving module 24. The receiving module 24 is configured to receive the address of the target service that is sent by the NRF when the verification succeeds.

Optionally, the query module 23 is further configured to: before sending the query request for querying the address of the target service to the NRF, form a complete domain name of a first service based on the service name of the NF and the management domain name of the NF, and send a first service registration request to the NRF, where the first service registration request includes the complete domain name of the first service and a first service address, so that the NRF performs service registration based on the complete domain name of the first service and the service name of the NF that is carried in the extension field of the digital certificate of the NF.

Optionally, the management domain name of the NF is dynamically generated by the management network element based on the network slice identifier, and is injected by a platform as a service (PaaS) in an image of the NF in a process in which the management network element requests the PaaS to deploy the NF in a network slice. The digital certificate of the NF is injected in an image of the NF in the process in which the management network element requests the PaaS to deploy the NF in the network slice.

Optionally, the management domain name of the NF and the digital certificate of the NF are configured after the NF is started.

The apparatus in this embodiment may be configured to perform the technical solutions in the method embodiment shown in FIG. 6, and implementation principles and technical effects of the apparatus are similar and are not described herein again.

Figure 13:
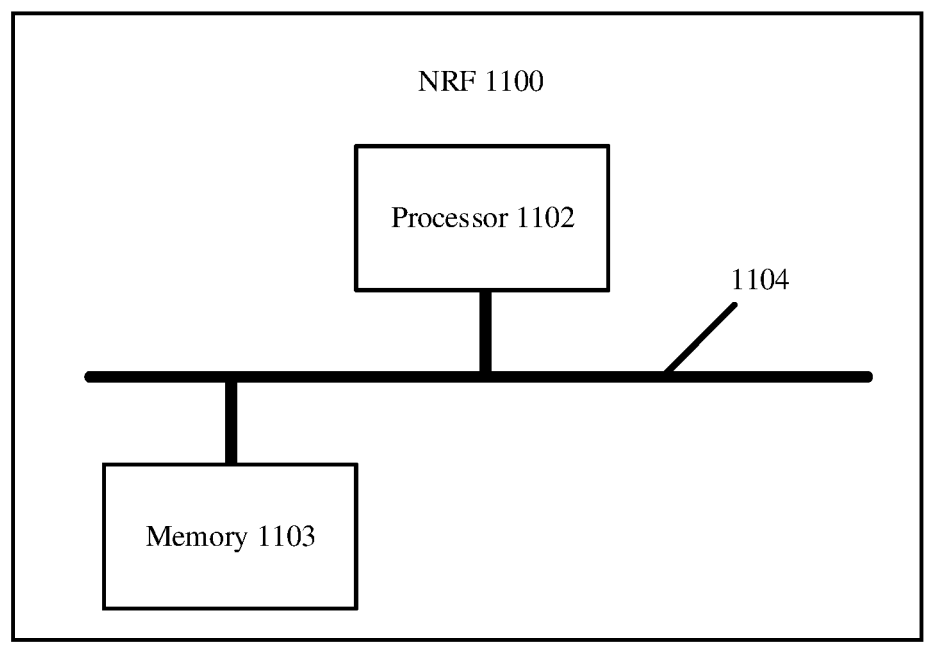
FIG. 13 is a schematic diagram of an NRF according to an embodiment of this application.

FIG. 13 is a schematic diagram of an example NRF device according to an embodiment of this application. The NRF device 1100 includes:

a memory 1103, configured to store a program instruction, and the memory may be, for example, a flash memory; and a processor 1102, configured to invoke and execute the program instruction in the memory, to implement the steps in the method shown in FIG. 3, FIG. 6, FIG. 7, or FIG. 8A and FIG. 8B. For details, refer to related description in the foregoing method embodiment.

Optionally, the memory 1103 may be separate from, or may be integrated with the processor 1102.

When the memory 1103 is a device separate from the processor 1102, the apparatus 1100 may further include:

a bus 1104, configured to connect the memory 1103 and the processor 1102.

The apparatus may be configured to perform the steps and/or procedures that are corresponding to the NRF in the foregoing method embodiments.

Figure 14:
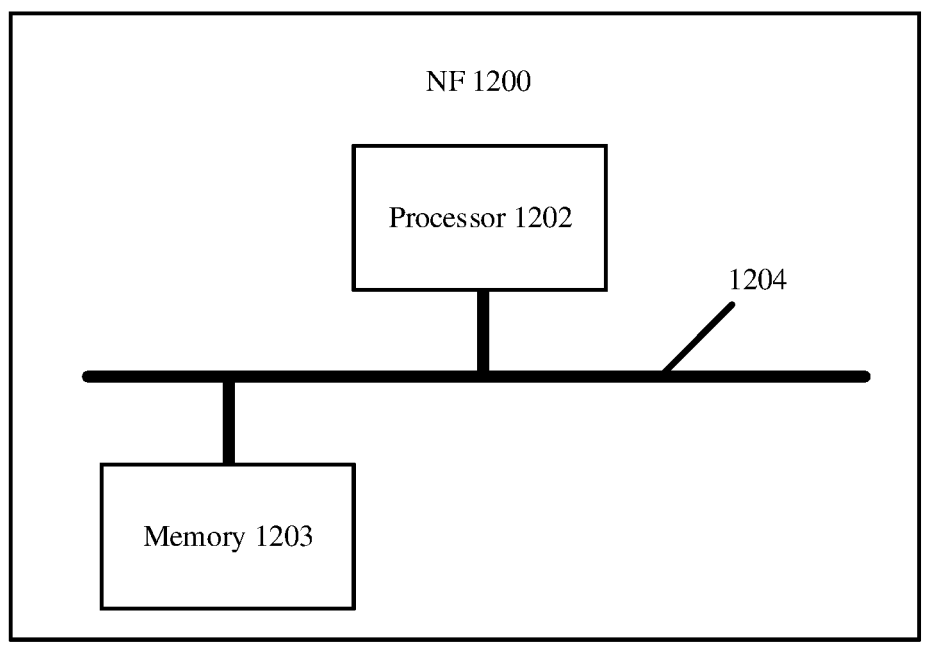
FIG. 14 is a schematic diagram of an NF according to an embodiment of this application.

FIG. 14 is a schematic diagram of an example NF according to an embodiment of this application. The NF 1200 includes:

a memory 1203, configured to store a program instruction, and the memory may be, for example, a flash memory;

a processor 1202, configured to invoke and execute the program instruction in the memory, to implement the steps in the method shown in FIG. 3, FIG. 6, FIG. 7, or FIG. 8A and FIG. 8B. For details, refer to related description in the foregoing method embodiment.

Optionally, the memory 1203 may be separate from, or may be integrated with the processor 1202.

When the memory 1203 is a device separate from the processor 1202, the apparatus 1200 may further include:

a bus 1204, configured to connect the memory 1203 and the processor 1202.

The apparatus may be configured to perform the steps and/or procedures corresponding to the NF in the foregoing method embodiment.

An embodiment of this application further provides a readable storage medium. The readable storage medium stores a computer program. When at least one processor of a discovery device (an NRF or an NF) of an NF service executes the computer program, the discovery device of the NF service performs the NF service discovery method provided in the foregoing implementations.

An embodiment of this application further provides a program product. The program product includes a computer program, and the computer program is stored in a readable storage medium. At least one processor of a discovery device of an NF service may read the computer program from the readable storage medium, and the at least one processor executes the computer program, so that the discovery device of the NF service performs the NF service discovery method provided in the foregoing implementations.

A person of ordinary skill in the art may understand that all or some steps of the method embodiments may be implemented by program instructing related hardware. The foregoing program may be stored in a computer-readable storage medium. When the program is executed, the steps of the method embodiments are performed. The foregoing storage medium includes any medium that can store program code, such as a ROM, a RAM, a magnetic disk, or an optical disc.

What is claimed is:

1. A network function service discovery method, comprising:

after establishing a communication connection to a network function (NF), obtaining, by a network function repository function (NRF), a digital certificate of the NF via a transport layer security (TLS) protocol or datagram transport layer security (DTLS) protocol two-way authentication process, wherein the digital certificate of the NF carries a service name of the NF, a first service name list on which the NF relies, and a second service name list that relies on the NF;

receiving from the NF, by the NRF, a first query request for querying an address of a target service, wherein the first query request carries a complete domain name of the target service, the complete domain name of the target service is formed by a service name of the target service and a first management domain name of the NF, or formed by the service name of the target service and a second management domain name of another NF in which the target service is located, and the first and second management domain names each comprises a network slice identifier of a network slice and an identifier of a network to which the network slice belongs; and performing, by the NRF, verification based on the service name of the target service and the digital certificate of the NF, and sending, by the NRF, the address of the target service to the NF when the verification succeeds.

2. The network function service discovery method according to claim 1, wherein the performing verification comprises:

verifying, by the NRF, whether the service name of the target service is in the first service name list that is carried in an extension field of the digital certificate of the NF, and whether the service name of the NF is included in the second service name list that is carried in the extension field of the digital certificate, and that is corresponding to the complete domain name of the target service that is registered and stored.

3. The network function service discovery method according to claim 1, wherein before the receiving the first query request, the method further comprises:

receiving, by the NRF, a first service registration request from the NF, wherein the first service registration request comprises a complete domain name of a first service and a first service address, and the complete domain name of the first service is formed by the service name of the NF and the first management domain name of the NF; and performing, by the NRF, service registration based on the complete domain name of the first service and the service name of the NF carried in an extension field of the digital certificate of the NF.

4. The network function service discovery method according to claim 3, further comprising:

forming, by the NF, the complete domain name of the first service based on the service name of the NF and the first management domain name of the NF, and sending the first service registration request to the NRF, so that the NRF performs service registration based on the complete domain name of the first service and the service name of the NF carried in the extension field of the digital certificate of the NF.

5. The network function service discovery method according to claim 3, wherein the performing the service registration comprises:
  verifying, by the NRF, whether the service name of the NF in the complete domain name of the first service is the same as the service name of the NF carried in the extension field of the digital certificate, and
  in response to the verification that the service name of the NF in the complete domain name of the first service is the same as the service name of the NF carried in the extension field of the digital certificate, registering and storing a correspondence among the complete domain name of the first service, the first service address, the first service name list, and the second service name list.

6. The network function service discovery method according to claim 1, further comprising:
  forming, by the NF, the complete domain name of the target service based on the service name of the target service and the first management domain name of the NF.

7. The network function service discovery method according to claim 1, further comprising:
  sending, by the NF to a management network element, a second query request for querying the second management domain name, wherein the second query request carries the service name of the target service; and
  after receiving from the management network element the second management domain name, forming, by the NF, the complete domain name of the target service based on the service name of the target service and the second management domain name.

8. The network function service discovery method according to claim 1, wherein the first management domain name of the NF is dynamically generated by a management network element based on the network slice identifier, and is injected by a platform as a service (PaaS) in an image of the NF in a process in which the management network element requests the PaaS to deploy the NF in the network slice, and the digital certificate of the NF is injected in the image of the NF in the process in which the management network element requests the PaaS to deploy the NF in the network slice.

9. The network function service discovery method according to claim 1, wherein the first management domain name of the NF and the digital certificate of the NF are configured after the NF is started.

10. A network function repository function (NRF) device, comprising:
  at least one processor, and a memory storing computer-executable instructions;
  wherein the computer-executable instructions, when executed by the at least one processor, cause the NRF device to:
  obtain a digital certificate of a network function (NF) via a transport layer security (TLS) protocol or datagram transport layer security (DTLS) protocol two-way authentication process after establishing a communication connection to the NF, wherein the digital certificate of the NF carries a service name of the NF, a first service name list on which the NF relies, and a second service name list that relies on the NF;
  receive, from the NF, a first query request for querying an address of a target service, wherein the first query request carries a complete domain name of the target service, wherein the complete domain name of the target service is formed by a service name of the target service and a first management domain name of the NF,
  or formed by the service name of the target service and a second management domain name of another NF in which the target service queried by the NF is located, and each of the first and second management domain names comprises a network slice identifier of a network slice and an identifier of a network to which the network slice belongs;
  perform verification based on the service name of the target service and the digital certificate of the NF; and
  send the address of the target service to the NF when the verification succeeds.

11. The NRF device according to claim 10, wherein the computer-executable instructions, when executed by the at least one processor, cause the NRF device to:
  verify whether the service name of the target service is in the first service name list that is carried in an extension field of the digital certificate of the NF, and whether the service name of the NF is included in the second service name list that is carried in the extension field of the digital certificate and that is corresponding to the complete domain name of the target service that is registered and stored.

12. The NRF device according to claim 11, wherein the computer-executable instructions, when executed by the at least one processor, cause the NRF device to:
  before receiving the first query request, receive a first service registration request from the NF, wherein the first service registration request comprises a complete domain name of a first service and a first service address, and the complete domain name of the first service is formed by the service name of the NF and the first management domain name of the NF; and
  perform service registration based on the complete domain name of the first service and the service name of the NF that is carried in the extension field of the digital certificate of the NF.

13. The NRF device according to claim 12, wherein the computer-executable instructions, when executed by the at least one processor, cause the NRF device to:
  verify whether the service name of the NF in the complete domain name of the first service is the same as the service name of the NF carried in the extension field of the digital certificate, and
  in response to the verification that the service name of the NF in the complete domain name of the first service is the same as the service name of the NF carried in the extension field of the digital certificate, register and store a correspondence among the complete domain name of the first service, the first service address, the first service name list, and the second service name list.

14. A network function service discovery system, comprising a network function (NF) and a network function repository function (NRF), wherein the NRF comprises at least one processor configured to obtain a digital certificate of the NF via a transport layer security (TLS) protocol or datagram transport layer security (DTLS) protocol two-way authentication process after establishing a communication connection to the NF, the digital certificate of the NF carrying a service name of the NF, a first service name list on which the NF relies, and a second service name list that relies on the NF,
  the NF comprises at least one processor configured to:
  sent, to the NRF, a first query request for querying an address of a target service, the first query request carrying a complete domain name of the target service, the complete domain name of the target service being
  1) formed by a service name of the target service and a first management domain name of the NF, or 2) formed by the service name of the target service and a second management domain name of another NF in which the target service queried by the NF is located, each of the first and second management domain names comprising a network slice identifier of a network slice and an identifier of a network to which the network slice belongs;

the at least one processor of the NRF is further configured to:

receive the first query request, perform verification based on the service name of the target service and the digital certificate of the NF;

and send the address of the target service to the NF when the verification succeeds; and the at least one processor of the NF is further configured to receive the address of the target service.

15. The network function service discovery system according to claim 14, wherein the verification performed by the NRF comprises:

verifying whether the service name of the target service is in the first service name list that is carried in an extension field of the digital certificate of the NF, and whether the service name of the NF is included in the second service name list that is carried in the extension field of the digital certificate, and that is corresponding to the complete domain name of the target service that is registered and stored.

16. The network function service discovery system according to claim 14, wherein the at least one processor of the NF is further configured to send a first service registration request to the NRF, the first service registration request comprising a complete domain name of a first service and a first service address, and the complete domain name of the first service being formed by the service name of the NF and the first management domain name of the NF, wherein the at least one processor of the NRF is further configured to receive the first service registration request; and perform service registration based on the complete domain name of the first service and the service name of the NF that is carried in an extension field of the digital certificate of the NF.

17. The network function service discovery system according to claim 16, wherein the at least one processor of the NF is further configured to form the complete domain name of the first service based on the service name of the NF and the first management domain name of the NF, and send the first service registration request to the NRF, so that the NRF performs service registration based on the complete domain name of the first service and the service name of the NF that is carried in the extension field of the digital certificate of the NF.

18. The network function service discovery system according to claim 16, wherein the service registration performed by the NRF comprises:

verifying whether the service name of the NF in the complete domain name of the first service is the same as the service name of the NF carried in the extension field of the digital certificate, and in response to the verification that the service name of the NF in the complete domain name of the first service is the same as the service name of the NF carried in the extension field of the digital certificate, registering and storing a correspondence among the complete domain name of the first service, the first service address, the first service name list that is carried in the extension field of the digital certificate, and the second service name list.

19. The network function service discovery system according to claim 14, wherein the at least one processor of the NF is further configured to form the complete domain name of the target service based on the service name of the target service and the first management domain name of the NF.

20. The network function service discovery system according to claim 14, wherein the at least one processor of the NF is further configured to send, to a management network element, a second query request for querying the second management domain name, wherein the second query request carries the service name of the target service; and after receiving from the management network element the second management domain name, form the complete domain name of the target service based on the service name of the target service and the second management domain name.

* * * * *